PELTIER HEATING AND COOLING OF SUBSTRATES AND MASKS
Filed Dec. 29, 1961
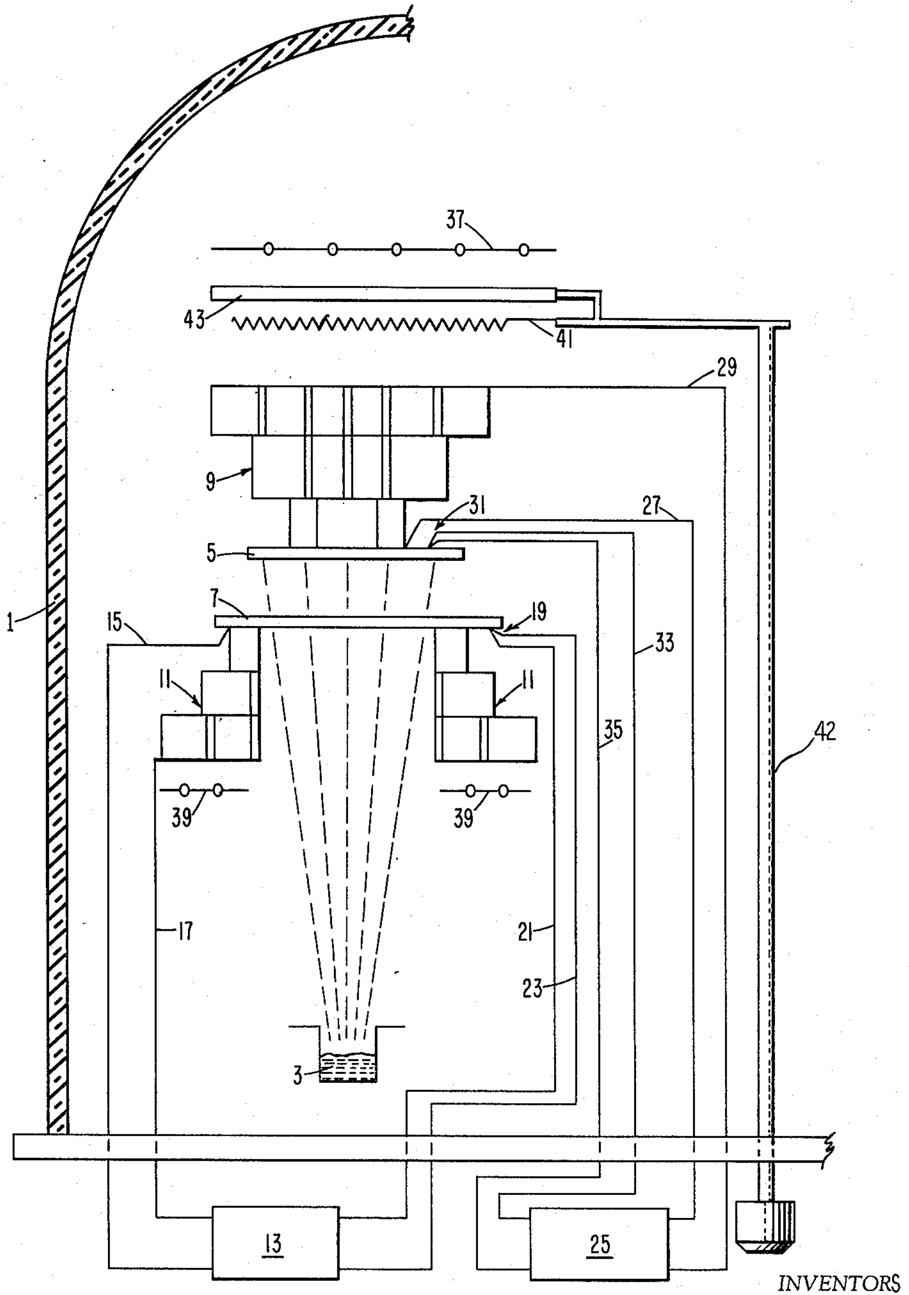
INVENTORS
IRVING AMES
RALPH B. De LANO JR.
BY Thomas & Crickenberger
ATTORNEYS United States Patent Office 3,161,542

Patented Dec. 15, 1964

3,161,542

PELTIER HEATING AND COOLING OF SUBSTRATES AND MASKS

Irving Ames, Peekskill, and Ralph B. De Lano, Jr., Chappaqua, N.Y., assignors to International Business Machines Corporation, New York, N.Y., a corporation of New York Filed Dec. 29, 1961, Ser. No. 163,328
7 Claims. (Cl. 118—5)

This invention relates to vapor deposition techniques, and more particularly to temperature control apparatus for maintaining desired temperatures of substrates and masks employed in vapor deposition processes.

The present trend to miniaturization and operational improvements in the field of computer technology has resulted in an ever increasing use of cryogenic devices. A basic cryogenic device is the cryotron, which was originally introduced in wire wound form, but which is presently being constructed as a thin film device by vapor deposition techniques. A common method employed for the deposition of thin films on substrates is the evaporation process. In this process, the substrate and the film forming source material are placed in a bell jar, whose interior pressure is reduced to a vaccum. The source material is then heated to an elevated temperature and evaporated. The vaporized material is directed towards the substrate resulting in a thin film of source material being deposited upon the substrate. A pattern mask is disposed between the source material and the substrate to define the configuration of the deposit on the substrate. When it is desired to make devices having several deposited layers, it is often necessary for both the jar in order to carry out the deposition process.

The temperature of the substrate within the bell jar has a pronounced effect on the characteristics of the deposited films. When the proper temperature is not maintained, the grain size of the deposited film on the substrate is not uniform, nor is the purity content sufficiently high. Proper control of the temperature of the pattern mask is also important in producing a high quality deposited film, for heating may cause generation of gas near the substrate because of thermal degassing of the mask and may cause warping of the mask pattern.

Since the mask and substrate must be movable and in addition have proper temperature control maintained, the problem presented is to maintain accurate temperature control of a movable device. It has been suggested that an exchange gas be employed to improve the heat transfer by convection within the bell jar. This is not a satisfactory solution since the gas will influence the purity of the deposited film, and control becomes especially difficult when the substrate is to be heated or cooled at the same time the pattern mask is to be maintained at a fixed temperature. Temperature control by heat conduction through sliding contacts to the movable parts is impractical because of the variations occurring in the contact resistance. The use of a flexible braid overcomes the contact resistance problem, but the flexible braid restricts the movement of the mask and substrate to an excessive degree.

The use of the radiation transfer process for heating and cooling has been found to be the most satisfactory. The radiation process is difficult to control and the temperature difference between the two objects must be large if there is to be an appreciable heat transfer. The present invention utilizes radiation as the basic heat transfer process and employs thermoelectric devices utilizing the Peltier effect for control purposes.

The Peltier effect is a thermoelectric phenomenon producing a reversible transformation of electrical potential energy and heat at a junction of dissimilar conductors. When a direct current exists in the proper direction across a junction of two dissimilar materials heat is converted to electrical potential energy and the junction is cooled. When the current is reversed, the junction is heated. The amount of heat transformed or converted at the junction is proportional to the current density and to the Peltier coefficient of the junction. A basic thermoelectric device has two junctions, a cold junction and a hot junction. The difference in temperature between the hot and cold junctions may be as much as 40° C., and this temperature differential can be increased by constructing devices employing two or more stages of basic elements. For example, a three stage thermoelectric device has been developed which will maintain a temperature difference of 100° C. with a heat load of ⅛ watt. This three stage device requires an electrical input of 2 amperes of current at 2.5 watts. Thermoelectric devices such as this are well known, and additional information can be obtained from "Journal of Applied Physics," volume 28, number 9, pages 1035 to 1042 (September 1957), and "Proceedings of the IRE," volume 46, number 3, pages 538 to 554 (March 1958).

A feature of the present invention is the provision of a temperature controlled system for vapor deposition processes utilizing thermoelectric devices for control purposes.

Another feature of the invention is the provision of a temperature controlled system for vapor deposition processes employing radiation as the heat transfer process with fixed hot and cold surfaces furnishing the principal sources of heating and cooling, while the fine temperature control is effected by thermoelectric devices.

In accordance with a preferred embodiment of the invention, these features are realized in a temperature controlled vapor deposition system comprising an evacuated bell jar containing a source of vaporizable material, a substrate on which the source material is to be deposited and a pattern mask interposed between the source and substrate to define the configuration of the deposited material. Cold surfaces are placed adjacent the mask and substrate, and a movable heater is located such that it may be brought in proximity to the substrate. Thermoelectric devices are fastened to the mask and the substrate and are operated from external control sources. Thermocouple sensors are attached to the substrate and the mask to furnish the control indications to the external controls. The temperatures of the cold surfaces and the heater are adjusted to bring the temperatures of the substrate and mask within the range of control of the thermoelectric devices attached thereto. Control signals from the thermocouple members attached to the mask and substrate regulate the amount of current through the thermoelectric elements, and consequently control the temperatures of the mask and substrate elements.

The foregoing and other objects, features and advantages of the invention will be apparent from the following more particular description of a preferred embodiment of the invention, as illustrated in the accompanying drawings, in which the sole figure is a diagrammatic illustration of the system according to the present invention.

The invention now will be described in more detail with reference to the drawing in which a bell jar is diagrammatically illustrated and indicated by a numeral 1. A source of vaporizable material 3 is located within the bell jar and is provided with suitable heating means (not shown) to raise the temperature of material to the vaporization point. A substrate 5 is positioned directly above the source 3, and a pattern mask 7 is disposed between the source 3 and the substrate 5. A three-stage thermoelectric element 9 is shown attached to one side of the substrate 5. Similarly, a three-stage thermoelectric element 11 is attached to the mask 7. The thermoelectric element 11 is designed such that the physical configuration allows the vaporized source material to pass freely through to the mask 7 and substrate 5. The thermoelectric devices 9 and 11 may be clamped to the substrate 5 and mask 7, respectively, by any conventional means, and thermal contact may be improved by the use of gold foil disposed between the members at the clamped joint.

The thermoelectric device 11 is energized from an external control circuit 13 through lines 15 and 17. The control circuit 13 supplies direct current to the thermoelectric device 11 in accordance with variations in temperature of the mask 7 as sensed by thermocouple 19, which is used to sense the mask surface temperature. Lines 21 and 23 from thermocouple 19 are connected to control circuit 13 to furnish a continuous monitoring of the mask surface temperature.

In similar fashion control circuit 25 supplies direct current to thermoelectric device 9 through lines 27 and 29. Thermocouple 31 which is fastened to substrate 5 supplies the control signals along lines 33 and 35 to control circuit 25. The control circuits 13 and 25 include variable D.C. supplies, the outputs of which are varied in accordance with the input signals from the thermocouple devices 19 and 31. An example of a suitable temperature monitoring and control circuit which could function to supply direct current to thermoelectric devices 9 and 11 is shown in U.S. Patent No. 2,197,635.

Suitable means having cold surfaces 37 and 39 are disposed within the bell jar 1 in proximity to substrate 5 and mask 7, respectively. In addition to this, a heater member 41 having a shield member 43 is movably mounted on rotatable shaft 42 so that it may move into and out of position over substrate 5, and between the cold surface 37 and substrate 5. When the substrate is to be heated, the movable heater member 41 is positioned as shown in the drawing with shield 43 interposed between heater 41 and cold surface 37. If it is desired to cool the substrate 5, the heater 41 and and shield 43 are moved out of the position shown so that they do not interfere between cold surface 37 and substrate 5.

Under normal operating conditions, it is necessary to heat the substrate 5 and cool the pattern mask 7. Control circuits 13 and 25 are designed to maintain the mask 7 and substrate 5 at the desired operating temperatures. Since the pattern mask 7 is to be cooled, current from control circuit 13 passes through thermoelectric device 11 to produce a cold junction at pattern mask 7 and a hot junction at the end adjacent cold surface 39. The hot junction radiates heat to cold surface 39, and since a temperature differential exists across the thermoelectric device 11, the pattern mask is cooled.

Conversely, since the substrate 5 is to be heated, the hot junction of thermoelectric device 9 is disposed adjacent substrate 5, and the cold junction is disposed adjacent the heater member 41. In this arrangement, the cold junction absorbs heat from heater 41, and since a temperature differential exists across thermoelectric device 11, the substrate 5 is heated. Thermocouple sensors 31 and 19 control the current outputs of control circuit 25 and 13 through thermoelectric elements 9 and 11 to maintain the desired temperatures at substrate 5 and mask 7.

It will be appreciated from the foregoing description that the present invention furnishes an accurate means of providing temperature control of substrates and masks within a vacuum chamber by the use of thermoelectric elements.

When the substrate 5 is to be cooled, the heater 41 and shield 43 are moved out of the position shown and circuit 25 is controlled to supply current in the opposite direction to thermoelectric device 9. If desired, the mask may also be heated by using an approximately placed heating element and reversing the direction of current supplied by circuit 13.

The use of thermocouple sensors in conjunction with external control circuits serves to maintain constant temperatures in a dynamic system utilizing electronic techniques. Heat transfer from the Peltier junctions is far greater than that which would occur from the substrate and mask because of the greater temperature difference across thermoelectric elements. Thus, the heat transfer time is effectively reduced.

While the invention has been shown and described with particular reference to a preferred embodiment, it will be understood by those skilled in the art the various changes in form and detail may be made without departing from the spirit and scope of the invention.

What is claimed is:

1. In a temperature controlled vapor deposition system a source of vaporizable material, a substrate, a mask interposed between the source and the substrate, thermoelectric elements adjacent the mask and the substrate, and means for energizing the thermoelectric elements in accordance with the temperatures of the mask and the substrate to maintain predetermined desired temperatures.

2. The system of claim 1 wherein said means is adapted to energize at least one of said thermoelectric elements with current in either a first or a second direction.

3. In a temperature controlled vapor deposition system a source of vaporizable material, a substrate, a mask interposed between the source and the substrate, thermoelectric elements adjacent the mask and the substrate, thermocouple sensors disposed to measure the surface temperatures of the mask and the substrate, a control circuit for each of said thermoelectric elements, and means coupling the thermoelectric elements and the thermocouple sensors to their associated control circuits, whereby variations in surface temperatures of the substrate and mask will cause their respective control circuits to be energized and produce a counteracting heating or cooling in the associated thermoelectric element.

4. In a temperature controlled vapor deposition system a source of vaporizable material, a substrate, a mask interposed between the source and the substrate, thermoelectric elements adjacent the mask and the substrate, means having a cold surface adjacent the mask, means having a hot surface adjacent the substrate, and means for energizing the thermoelectric elements in accordance with the temperatures of the mask and the substrate to maintain predetermined desired temperatures, said cold and hot surfaces facilitating the transfer of heat from the associated thermoelectric elements.

5. In a temperature controlled vapor deposition system a source of vaporizable material, a substrate, a first thermocouple disposed on said substrate, a mask interposed between the source and the substrate, a second thermocouple disposed on said mask, a first thermoelectric element disposed adjacent said substrate, a second thermoelectric element disposed adjacent said mask, means having a cold surface disposed adjacent said mask, means having a hot surface disposed adjacent said substrate, a first control circuit, a second control circuit, and means connecting said first thermocouple, said first control circuit and said first thermoelectric element and said second thermocouple, said second control circuit and said second thermoelectric element, whereby said first and second thermoelectric elements are selectively energized to produce heat transfer between said first and second thermoelectric elements and said heating and cooling surfaces, respectively.

6. In a vapor deposition system the combination comprising a source of vaporizable material, a substrate, a mask located between said source and said substrate, a first thermoelectric element clamped to said substrate, a second thermoelectric element clamped to said mask, a first thermocouple element disposed on said substrate, a thermocouple element disposed on said mask, means having a first cold surface located adjacent said substrate, means having a second cold surface located adjacent said mask, means having a hot surface movably mounted for disposition between said substrate and said first cold surface, a first control circuit, a second control circuit, means connecting said first thermocouple element, said first control circuit and said first thermoelectric element, and means connecting said second thermocouple element, said second control circuit and said second thermoelectric element, whereby said thermoelectric elements maintain accurate temperature control of said substrate and said mask.

7. The combination according to claim 6 wherein said hot surface is provided with a shield disposed between said hot surface and said first cold surface.

References Cited in the file of this patent

UNITED STATES PATENTS

| | | |
|---|---|---|
| 2,868,736 | Weinreich | Jan. 13, 1959 |
| 2,967,111 | Coghill et al. | Jan. 3, 1961 |
| 2,969,296 | Walsh | Jan. 24, 1961 |
| 3,015,586 | Toohig et al. | Jan. 2, 1962 |